United States Patent
Kawamae

(10) Patent No.: US 8,369,194 B2
(45) Date of Patent: Feb. 5, 2013

(54) OPTICAL DISC DEVICE, OPTICAL DISC RECORDING METHOD, AND REPRODUCTION METHOD

(75) Inventor: Osamu Kawamae, Kawasaki (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 168 days.

(21) Appl. No.: 12/599,171

(22) PCT Filed: Aug. 6, 2008

(86) PCT No.: PCT/JP2008/064140
§ 371 (c)(1),
(2), (4) Date: Jul. 19, 2010

(87) PCT Pub. No.: WO2009/022608
PCT Pub. Date: Feb. 19, 2009

(65) Prior Publication Data
US 2010/0278025 A1 Nov. 4, 2010

(30) Foreign Application Priority Data

Aug. 10, 2007 (JP) .................................. 2007-209155
Jun. 3, 2008 (JP) .................................. 2008-145758

(51) Int. Cl.
*G11B 7/00* (2006.01)
(52) U.S. Cl. ................ 369/44.33; 369/44.39; 369/53.36; 369/53.17
(58) Field of Classification Search ........................ None
See application file for complete search history.

(56) References Cited

U.S. PATENT DOCUMENTS

| | | | |
|---|---|---|---|
| 5,841,748 A * | 11/1998 | Yamamuro | 369/47.14 |
| 6,160,778 A | 12/2000 | Ito et al. | |
| 6,341,109 B1 | 1/2002 | Kayanuma | |
| 6,469,978 B1 | 10/2002 | Ohata et al. | |
| 7,020,799 B2 * | 3/2006 | Tol et al. | 714/6.13 |
| 7,203,153 B2 * | 4/2007 | Kuraoka et al. | 369/275.3 |
| 7,257,742 B2 * | 8/2007 | Fujita | 714/48 |
| 7,734,964 B2 * | 6/2010 | Nakata | 714/710 |

(Continued)

FOREIGN PATENT DOCUMENTS

EP   1 035 544 A2   9/2000
EP   1035544 A2 *  9/2000

(Continued)

OTHER PUBLICATIONS

Japanese Office Action issued in Japanese Patent Application No. 2008-145758 dated Sep. 4, 2012.

*Primary Examiner* — Peter Vincent Agustin
(74) *Attorney, Agent, or Firm* — McDermott Will & Emery LLP

(57) ABSTRACT

Even when recording data which is continuously inputted at a high speed, it is possible to correct a recording error and reproduce preferable AV data without a noise upon reproduction. A recording error detection circuit (14) detects an error generation upon recording according to the fluctuation of amplitude of a tracking error signal or a focus error signal. A recording signal processing circuit (6) again records (performs skip recording) the same data in a region subsequently adjacent to a region where a recording error has occurred. When performing the skip recording, address information contained in the recording data is rewritten into address information on a new recording region. Moreover, an identifier (skip mark) indicating that a recording error has occurred is added to the pattern of the link region of the recording data.

8 Claims, 12 Drawing Sheets

U.S. PATENT DOCUMENTS

| | | | |
|---|---|---|---|
| 7,865,059 B2* | 1/2011 | Holtman | 386/241 |
| 2002/0150009 A1 | 10/2002 | Tokumitsu et al. | |
| 2003/0002860 A1 | 1/2003 | Ono et al. | |
| 2004/0001408 A1* | 1/2004 | Propps et al. | 369/53.17 |
| 2004/0218488 A1* | 11/2004 | Hwang et al. | 369/44.32 |
| 2007/0061636 A1* | 3/2007 | Nakata | 714/710 |
| 2007/0247991 A1 | 10/2007 | Nakagawa | |

FOREIGN PATENT DOCUMENTS

| | | |
|---|---|---|
| JP | 61-283074 | 12/1986 |
| JP | 63-316371 | 12/1988 |
| JP | 11-185390 | 7/1999 |
| JP | 2000-228070 | 8/2000 |
| JP | 2000-251260 | 9/2000 |
| JP | 2000-322835 | 11/2000 |
| JP | 2000-322836 | 11/2000 |
| JP | 2002-312947 | 10/2002 |
| JP | 2003-085897 | 3/2003 |
| JP | 2005-327405 | 11/2005 |
| JP | 2006-338739 | 12/2006 |

* cited by examiner

FIG.13

| No. | RECORDING SPECIFICATION ADDRESS | ADDRESS AFTER SKIPPING | SKIP LENGTH | TOTAL OF SKIPS |
|---|---|---|---|---|
| 1 | AAAA | AAAA+1 | 1 | 1 |
| 2 | BBBB | BBBB+1 | 1 | 2 |
| 3 | CCCC | CCCC+3 | 3 | 5 |
| 4 | DDDD | DDDD+n | n | 5+n |
| : | : | : | : | : |
| : | : | : | : | : |
| END | FFFF··FF | FFFF··FF | | |

FIG.14

| No. | ATTRIBUTION | SKIP REGION ADDRESS | SKIP LENGTH | TOTAL OF SKIPS |
|---|---|---|---|---|
| 1 | SINGLE | AAAA | 1 | 1 |
| 2 | SINGLE | BBBB | 1 | 2 |
| 3 | CONTINUOUS/START | CCCC | - | - |
| 4 | CONTINUOUS/END | CCCC+2 | 3 | 5 |
| 5 | ATTRIBUTION | DDDD | - | - |
| 6 | ATTRIBUTION | DDDD+(n-1) | n | 5+n |
| : | : | : | : | : |
| : | : | : | : | : |
| END | END | FFFF··FF | | |

OPTICAL DISC DEVICE, OPTICAL DISC RECORDING METHOD, AND REPRODUCTION METHOD

RELATED APPLICATIONS

This application is the U.S. National Phase under 35 U.S.C. §371 of International Application No. PCT/JP2008/064140, filed on Aug. 6, 2008, which in turn claims the benefit of Japanese Application Nos. 2007-209155, filed on Aug. 10, 2007 and 2008-145758, filed on Jun. 3, 2008, the disclosures of which Applications are incorporated by reference herein.

TECHNICAL FIELD

The present invention relates to an optical disk device, an optical disc recording method, and a reproduction method in which in the case where a defect is present on a recording region of an optical disc medium, data are recorded and reproduced using a region subsequently adjacent to the recording region.

BACKGROUND ART

In a rewritable or recordable optical disc medium such as CD-R/RW, DVD±R/RW, or DVD-RAM, a defect occurs at a part of the medium in some cases if the same disc is repeatedly used. The defect is caused by damage or scratches of the medium, adhesion of fingerprints or taint, or deterioration of a recording film. If recording is performed on the defect portion, data cannot be normally read. It is difficult to eliminate the occurrence of such a defect on the whole disc surface. Accordingly, there has been employed an alternative processing method in which data are not recorded at a sector portion where the defect has occurred, but alternative recording of the defect sector is performed at an alternative region (spare region) provided on the same optical disc.

In order to confirm whether or not data recording has been normally performed in the alternative processing method, a so-called verifying operation in which data of a recorded sector are reproduced to assess the number of errors is carried out. In the case where errors exceeding an acceptable value are detected, it is determined as a recording failure (occurrence of a defect), and an alternative process is performed.

As a technique relating to the above, Patent document 1 discloses a storing device aiming at a high speed of a writing operation of data by reducing the number of writing times of data for the alternative process. The storing device is configured in such a manner that there is provided data storage means for temporarily storing data when performing the alternative process for data to be written into a defect sector, the data are temporarily stored into the data storage means when performing the alternative process for the data to be written into the defect sector, and data of a plurality of sectors for which the alternative process is performed are stored into a spare sector region at a time.

Patent document 1: Japanese Patent Application Laid-Open No. H11-185390

DISCLOSURE OF THE INVENTION

Problem to be Solved by the Invention

In the alternative recording process, in addition to a period during which data are recorded, a period for a verifying operation to reproduce and assess data is added. Further, as alternative regions where the alternative recording is performed, regions which are provided separately from data regions and which are located at the inner or outer circumference of a disc are used, so that it is necessary to move an optical head to the position of an alternative region apart from a current data recording position where a defect has occurred. An interruption period is required to perform such an alternative process, and thus it is necessary that the process spares much time. Accordingly, in the case where data such as audio/voice data (AV data) are continuously input in real-time at a high speed (stream recording), it is difficult to apply the alternative process. In the technique of Patent document 1, a plurality of alternative recordings are performed at a time. However, the fact remains that the verifying operation for recorded data is performed every time, and thus it is not a fundamental solution.

Thus, in the conventional stream recording, the verifying process for reproducing and conforming recorded data after recording is not performed, but data are continuously recorded. As a result, if a recording failure occurs during recording, the recording is still continued without any correction. Thus, the data which could not be correctly recorded cause a reproducing error at the time of reproducing, and there arises a problem such as occurrence of a noise in the reproduced data.

An object of the present invention is that even in the case where data to be continuously input at a high speed are recorded, preferable excellent AV data without a noise are regenerated at the time of reproducing by correcting a recording error.

Means for Solving the Problem

According to the present invention, there is provided an optical disc device for recording and reproducing data into/from a recordable optical disc, the device including: an optical pickup which irradiates laser light onto the optical disc to record or reproduce data; a recording error detection circuit which detects occurrence of an error at the time of recording on the basis of changes of the amplitude of a tracking error signal or a focus error signal detected by the optical pickup: a recording signal processing circuit which generates a recording signal while processing recording data and records the same data again (skip recording) into a region subsequently adjacent to that where the recording error has occurred; and a controlling circuit which, when receiving an error detection signal from the recording error detection circuit, instructs the recording signal processing circuit to perform the skip recording.

The recording signal processing circuit rewrites, for a recording signal to perform the skip recording, address information included in data into that of a new recording region. Further, the recording signal processing circuit adds, for a recording signal to perform the skip recording, identifiers for indicating that a recording error has occurred to patterns of a link region of the recording data.

According to the present invention, there is provided an optical disc recording method for recording data into a recordable optical disc, the method including: a step of detecting occurrence of an error at the time of recording on the basis of changes of the amplitude of a tracking error signal or a focus error signal: and a step of recording the same data again (skip recording) into the subsequently adjacent region when a recording error occurs.

According to the present invention, there is provided an optical disc reproduction method for reproducing data from a recordable optical disc, the method including: a step of detecting, from a reproduced signal, identifiers for indicating that an error has occurred at the time of recording; and a step of, in the case where the identifiers are detected, performing a process of the next data after stopping a process of the data.

According to the present invention, there is provided an optical disc on which temporally-continuous data are sequentially recorded into continuous recording regions on a predetermined unit basis, wherein for the recording data in which the recording error has occurred, the same recording data are recorded again into a recording region subsequently adjacent to that where a recording error has occurred.

Effect of the Invention

According to the present invention, even in the case where a recording error occurs in data to be continuously input at a high speed, preferable AV data without a noise can be regenerated at the time of reproducing by promptly correcting the recording error.

Best Mode for Carrying Out the Invention

Hereinafter, an embodiment of the present invention will be described using the drawings.

FIG. 1 is a block diagram showing an embodiment of an optical disc device according to the present invention. The device of the embodiment is coupled to a host device (such as a PC) (not shown), and records and reproduces AV data or the like into/from an optical disc 1. The optical disc 1 is a medium of a rewritable or recordable type such as CD-R/RW, DVD±R/RW, or DVD-RAM. As a medium, a BD-R/RE disc in conformity with the BD (Blu-ray Disc) standard that is a large-capacity medium is used, so that large-volume data such as high-definition video can be recorded at a high speed. The embodiment will be described hereinafter with an example of a BD medium.

The optical disc 1 loaded is rotated and driven by a spindle motor 12. An optical pickup 2 irradiates laser light generated by a laser light source (semiconductor laser) onto a recording surface of the optical disc 1 to record or reproduce data. The optical pickup 2 is moved to a desired track position on the optical disc 1 by a thread mechanism (not shown).

The optical pickup 2 allows a light detector to detect reflected light from the optical disc to be converted into an electric signal. An analog front-end (AFE) circuit 3 generates a reproducing RF signal, a tracking error (TE) signal and a focus error (FE) signal from the detected signal. A servo controlling circuit 13 generates tracking and focus servo signals on the basis of the TE signal and the FE signal to be supplied to the spindle motor 12 or the optical disc 2, and controls operations of the spindle motor 12 or the optical pickup 2.

A reproducing signal processing circuit 9 performs a demodulation process, a decoding process, an error correction process, and the like for the reproducing RF signal, and temporarily stores reproduced data into a buffer memory 8. The reproduced data stored in the memory 8 are transferred to the host device (not shown) via an input/output circuit 10 and a terminal 11.

When recording data, recording data supplied from the host device via the input/output circuit 10 and the terminal 11 are temporarily stored into the buffer memory 8. A recording signal processing circuit 6 reads a predetermined amount of data from the memory 8, and performs an error correction code adding process, an encoding process, a modulation process, and the like to generate a recording signal. A write pulse generating circuit 7 converts the recording signal into a laser emission pulse train to be supplied to the pickup 2, and records the signal into the optical disc 1.

Further, a recording error detection circuit 14 checks whether or not a recording operation has been normally performed in the embodiment. Specifically, the recording error detection circuit 14 monitors changes of the tracking error (TE) signal from the servo controlling circuit 13 to be compared with an acceptable value (threshold value) by an amplitude/time determination circuit 18. The acceptable value is determined on the basis of a limit within which an error of the reproduced data can be corrected when reproducing the recorded data. In the case where the level of the TE signal exceeds the acceptable value due to scratches or defects of the disc, it is determined as occurrence of a recording error, and the same data are recorded again into a region subsequently adjacent to that where the recording error has occurred. Hereinafter, the operation is referred to as "skip recording".

The recording signal processing circuit 6 performs skip recording and stores the address information of the position where the error has occurred into a stop position storing circuit 16. Then, the recording signal processing circuit 6 rewrites the address information added to recording data, and records, into a boundary region of data, identifiers for indicating that a recording error has occurred. The identifiers are used for performing "skip reproducing" which skips data where an error has occurred at the time of reproducing. When receiving an error detection signal from the recording error detection circuit 14, a system controlling circuit 15 instructs the recording signal processing circuit 6 and the like to switch to the skip recording.

FIG. 2 is a diagram showing an example of a recording pattern on the optical disc by the skip recording. FIG. 2(a) shows a recording pattern in normal recording (at the time of usual recording), and data D1, D2, and D3 are sequentially recorded into regions 21, 22, and 23 partitioned on a track on a predetermined unit basis (on a Cluster basis in the case of a BD). Address information (which is included in a BIS region in the case of a BD) is added to each data, and is represented by A1, A2 or A3.

FIG. 2(b) shows a detection signal 29 for a recording error, and it is assumed that an error has occurred during recording of the data D1 into the region 21.

FIG. 2(c) shows a recording pattern by the skip recording. In the case where a recording error occurs at the time of recording into the region 21, data D1' which are the same as the data D1 are recorded again (skip recording) into the subsequently adjacent region 22 that follows. If the data D1' can be normally recorded, the data D2 and D3 are continuously recorded. If the recording of the data D1' also fails, data D1" which are the same as D1 are recorded by the skip recording into the subsequently adjacent region 23. In the case where the skip recording has been performed, the address information added to data is rewritten into that of the new position where the skip recording has been performed. Specifically, by changing to information corresponding to a physical address of each region, the compatibility of management data is maintained. In this example, the address information of the data D1' is rewritten from A1 to A2, and the address information of the data D2 is rewritten from A2 to A3.

FIG. 2(d) shows identifiers (skip marks) to be added to a boundary region (link region) of respective data. In this example, the skip marks (Skip-A, Skip-B) are added to a Run-out region 61 of the data D1 where an error has occurred and a Run-in region 62 of the data D1' where the skip recording has been performed. The skip marks show that a recording error has occurred at the data D1 immediately before the skip marks and the same data D1 are recorded again as D1' into the next region. A specific example of the skip marks will be described later.

A recording error possibly occurs even in the skip recording. In this case, the skip recording is performed again, and an upper limit (acceptable number of times) is set to the number of repeating times. Specifically, during the skip recording, data to be recorded for the next time are accumulated in the buffer memory. The capacity of the memory is limited, so that an acceptable value of the number of repeating times is set so as not to overflow the stand-by data in accordance with the capacity. In the case where data recording finally fails even though the skip recording has been performed up to the acceptable number of times, the system controlling circuit 15 instructs to stop the recording of the data and to proceed to recording of the next data.

As described above, when a recording error occurs, the same data are recorded into the next region. Then, information for indicating that the skip recording has been performed may be registered into a management information region on the optical disc. The information includes at least address information of a region where the skip recording has been started due to a recording error and address information of a region where the data have been recorded without occurrence of a recording error.

FIG. 3 is a diagram showing a configuration example of the buffer memory 8. Here, a storage state of recording data is shown. Recording data input from the host device are stored into a region b(32), and a working region c(33) is used for an encoding process. The encoded data are stored into a region d(34). A predetermined amount of data is shifted from the region d to a region e(35), and then is output as recording data. It is obvious that the encoded recording data may be sequentially output from the region d without shifting the data in the buffer memory 8.

For rewriting of the address information included in the above-described BIS portion, the address information and a portion relating to the address information, for example, a parity may be rewritten on the buffer memory 8, or the BIS portion may be additionally generated not on the memory. It should be noted that storing of reproduced data by the buffer memory 8 is similarly performed by replacing the encoding process with a decoding process.

In the case where data such as AV data are continuously input at a high speed, if the storage quantity of data at each region is not accurately controlled, the data are easily overflowed, and some real-time videos lack. In the skip operation of the embodiment, a retaining period of recording data at the region e(35) can be suppressed to the minimum. Specifically, since a verifying operation for recorded data is not provided and the skip recording is performed at the subsequently adjacent region, the retaining period in the buffer can be largely shortened as compared with conventional alternative recording. Further, even in the case where the skip recording is repeated, there is not a possibility of overflow due to provision of the upper limit of the number of repeating times. Accordingly, even in the case where a recording error occurs, it is possible to correct by re-recording without collapsing the buffer memory.

FIG. 4 is a diagram explaining an example of a recording error detection method. In the case where changes of the envelope of a tracking error (TE) signal are monitored and the amplitude level thereof exceeds a reference value Vref, the amplitude/time determination circuit 18 determines as a defect region (scratches of the disc). At such a defect region, a recording operation is unreliable and an error occurs in recording data in many cases. The reference value Vref is determined in accordance with conditions where error correction becomes impossible at the time of reproducing. Further, in consideration of a duration time t exceeding the reference value Vref, determination of the defect region is performed. Error correction can be performed as long as the defect occurs in a short time, and it is possible to prevent an unnecessary operation of skip recording. In addition, in the case where a plurality of defects in a short time are generated at the same Cluster, the duration time t is obtained by adding these times together so as to be determined as a defect region As a recording error detection method, it is also advantageous to monitor the envelope of a focus error (FE) signal other than the above. A summation signal of reflected light from the optical disc may be monitored. In addition, by monitoring changes of optical light amounts, a recording error can be detected. According to these detection methods, recorded dada are not verified (verifying operation) by reproducing the data, so that determination can be promptly performed while recording data. Further, in order to confirm whether or not the recoded data can be reproduced, the recorded data may be confirmed by another pickup.

FIG. 5 is a diagram showing a configuration of recording data (Cluster) on a BD. According to the BD standard, in order to enhance a detection capability for a long burst error, there is employed a picket code method in which aligned data BISs (Burst Indicator Subcodes) 52 are periodically incorporated into an LDC (Long Distance Code) 51 that is a main data block. Address information of recording data is stored in the BIS (52). In the case of performing the skip recording, the address of data after the recording is changed, which causes a problem in data management if the old address information is left unchanged. Thus, the address information is rewritten so as to correspond to that of a new recoding position, so that compatibility in the BD standard is maintained. Here, in the case where the address information in the BIS (52) is not changed, the address where data to be recorded are skipped first is left. By counting a difference between the addresses, it is not necessary to change the address.

FIG. 6 is a diagram showing an example of identifiers (skip marks) to be added when a recording error occurs. Further, FIG. 7 is a diagram showing an example of a code pattern used for the identifiers. The identifiers for indicating that a recording error has occurred change a pattern of the Run-out region 61 and the Run-in region 62 that serve as a connection (link) region) of recording data.

FIG. 6(*a*) shows a case of normal recording (at the time of usual recording). In the link region, synchronizing signals Sync3, Sync1, and Sync2 are included in particular positions 63, 66 and 68, respectively. Further, as specific data repeating patterns, fixed patterns P1 and P2 of FIG. 7 are recorded into other regions 64, 65, 67, and 69.

FIG. 6(*b*) shows an example of the skip marks when a recording error occurs, and the fixed patterns P1 and P2 are changed into fixed patterns P3 and P4 of FIG. 7 as different specific patterns to be recorded into the regions 64, 65, 67, and 69. These fixed patterns are distinguished by changing a combination of bit lengths to be generated without changing the length of the whole bit length. It should be noted that all of the regions 65, 67, and 69 may not be changed into the fixed patterns P4, but only a part thereof (for example, only the region 69) may be changed into the fixed pattern P4. The fixed pattern 3 is used for identifying the polarity of a signal for the fixed pattern P1, and it is easily identified that P3 is a specific pattern. Further, if the specific pattern is recorded into only the region 69, a specific pattern can be easily embedded because after a recording error occurs at the previous Cluster, there are much time before a switching process.

FIG. 6(c) shows another example of the skip marks when a recording error occurs, the positions of the synchronizing signals Sync3, Sync1, and Sync2 are changed into regions 63', 66', and 68' without changing the specific patterns (similar to FIG. 6(a)). In this case, the order of the synchronizing signals may be changed, or a new synchronizing signal may be added.

Furthermore, as skip marks when a recording error occurs, both of the specific patterns and the synchronizing signals can be changed by combining (b) and (c).

Accordingly, by referring to the information of the link region, it is possible to identify that the skip recording, not the normal recording, has been performed. It should be noted that user control data in the BIS region described in FIG. 5 are used, and a flag indicating that the skip recording has been performed may be written into such an identifier.

FIG. 8 is a diagram showing an example of a circuit configuration for adding the identifiers of FIG. 6(b). A fixed pattern generating circuit 82 generates the fixed patterns P1 and P2 shown in FIG. 7, and a fixed pattern generating circuit 83 generates the fixed patterns P3 and P4. A switch (SW2) 84 switches and selects these patterns by control of an identifier adding circuit 86. Specifically, the switch selects the pattern generating circuit 82 side in the normal recording (at the time of usual recording) and the pattern generating circuit 83 side in the skip recording (when a recording error occurs). The selected fixed pattern is added to the link region of recoding data 81 by a switch (SW1) 85 to be recorded into the disc.

FIG. 9 is a flowchart showing a recording method in the embodiment. Hereinafter, respective steps will be explained in order.

In S101, the recording signal processing circuit 6 receives recording data (on a Cluster basis) from the memory 8, and records the data while advancing the pickup 2 to a predetermined region (address)) on the disc. In S102, a tracking error signal during recording is monitored by the recording error detection circuit 14, and it is determined whether or not a recording error has occurred. If it is determined that no recording error has occurred, the operation proceeds to a process of the next Cluster in S104.

If it is determined that an error has occurred in S102, it is determined whether or not the number of times of error occurrence has exceeded n times (acceptable value) in a row in data recording of the same Cluster. If the number of times of error occurrence has exceeded n times, recording of the Cluster is stopped, and the operation proceeds to a process of the next Cluster in S104.

If the number of errors is within n times in S103, the recording is switched to the skip recording, and the Cluster is recorded into the next region again. Therefore, the address information is rewritten into the address of the next region where the skip recording is performed in S106. Address information included in the BIS region is changed in the BD. In S107, the identifiers (skip marks) for indicating the skip recording has been performed are added. Specifically, a code pattern of the Run-out region and the Run-in region that serve as the link region is changed as shown in FIG. 6 to FIG. 8.

In S105, it is determined whether or not the data recording has been completed. If not, the flow returns to S101, and the pickup 2 is advanced to the next region (address) to record the Cluster. If the recording at this time is performed through S107, the recoding Cluster is not updated. Accordingly, the skip recording of the same Cluster is performed.

In the recording method of the embodiment, occurrence of a recording error is promptly detected to record the data again while skipping to the subsequently adjacent region. Thus, data to be input in real-time can be adequately tracked, and a reproducing error can be prevented.

FIG. 10 is a flowchart showing a reproduction method in the embodiment. Hereinafter, respective steps will be explained in order.

In S201, the reproducing signal processing circuit 9 reproduces data from the disc, and sequentially stores the same into the memory 8. In S202, the reproduced data are read from the memory 8 on a Cluster basis, and it is checked whether or not the identifiers (skip marks) for indicating the skip recording have been added by referring to the link region of the reproduced data. For example, if the skip mark is detected from the Run-out or Run-in region, it is determined that theCluster is a defect Cluster. If it is determined as a defect Cluster, a process of the Cluster is stopped (skipped) to proceed to data of the next Cluster in S203 (in this case, the data are the same). Then, the determination of the identifiers of the next Cluster is repeated in S202.

If the identifier has not been detected in S202, it is determined that the Cluster is normal, and an error correction process is performed by the reproducing signal processing circuit 9 in S204. If the correction result is determined and the correction has been normally performed in S205, the data are output in S207. In the case where it is determined that the correction was impossible in S205, the flow proceeds to S206 to reproduce the data of the Cluster again (retry of reproducing). In S208, it is determined whether or not reproducing of all data has been completed, and if there are remaining data, the above-described steps are repeated.

Even in the case where the identifier has been detected in S202, if the data can be completely corrected by the error correction process, it is not necessary to reproduce the data while skipping to the next region. In the case where some data can be corrected and some data cannot be corrected, only data which cannot be corrected may be used for the nest region.

In the reproduction method of the embodiment, defect data are promptly identified by the identifier to skip, so that a stand-by time in the reproducing process can be shortened.

FIG. 11 shows an example of transmission and reception of a command at the time of data recording in the case where the input/output circuit 10 shown in FIG. 1 is coupled to an external host device (not shown). The drive is shown on the left side of FIG. 11, and the host device is shown on the right side.

(C11) In the case where data are recorded by the drive, a record starting instruction for indicating that recording is stated is transmitted from the host device to the drive. If the drive is in a recordable state, the drive transmits a record-starting-instruction confirmation command for indicating that the record starting instruction is permitted to the host device.

(C12) Next, the host device specifies a recording mode. For example, when data such as broadcasting data are continuously recorded, a stream recording mode or a real-time recoding mode is specified. Alternatively, it may be shown that the recording data are stream data which are continuously transferred. On the other hand, the drive side returns a command for indicating that the recording mode has been confirmed.

(C13) In order to confirm a region for recording on the disc, the host device inquires the drive about a record starting address or the address of an already-recorded region where data have already been recorded. The drive replies a top address of the region where recording can be started, or an address where data have been recorded last time.

(C14) Then, the host device starts to transmit the recording data to the drive. At this time, the data may be transmitted while specifying the address where recording is started. The host device continuously transmits the recording data. When transmission of the last recording data is completed, a recording data transmission completion command is transmitted. The drive returns a command for indicating that the recording data have been completely received.

(C15) Further, the drive returns recording completion and the address of the recording when the recording of the delivered data is completed. At this time, not the recorded addresses but a skip amount for indicating the number of Clusters where recording has not been performed due to defects and the like may be delivered.

By performing such command transmission and reception, the host device can recognize the number of regions where recording has not been performed due to defects and the like, and the number of recording regions remaining on the disc. Further, by using the information of the number of remaining recording regions, the amount of data to be recorded can be controlled. For example, in the case where recording data are video data, it is possible to control so as to reduce recording data by increasing a compression rate.

By performing such command transmission and reception, the host device can know the address where data have been actually recorded on the disc, and can manage recorded regions of the disc. Further, it is possible to recognize skipped regions and the size thereof, and remaining recording regions and regions where defects are present on the disc.

FIG. 12 shows another example of command transmission and reception when the data are recorded as shown in FIG. 11. The drive is shown on the left side of FIG. 12, and the host device is shown on the right side.

(C21) In the case where data are recorded by the drive, a record starting instruction for indicating that recording is stated is transmitted from the host device to the drive. If the drive is in a recordable state, the drive transmits a record-starting-instruction confirmation command for indicating that the record starting instruction is permitted to the host device.

(C22) Next, the host device specifies a recording mode. For example, when data such as broadcasting data are continuously recorded, a stream recording mode or a real-time recording mode is specified. Alternatively, it may be shown that the recording data are stream data which are continuously transferred. On the other hand, the drive side returns a command for indicating that the recording mode has been confirmed.

(C23) In order to confirm a region for recording on the disc, the host device inquires the drive about a record starting address or the address of an already-recorded region where data have already been recorded. The drive replies a top address of the region where recording can be started, or an address where data have been recorded last time.

(C24) Then, the host device transmits the recording data to the drive on a predetermined unit basis. At this time, the data may be transmitted while specifying the address to be recorded. Further, the predetermined unit may be a sector unit, or a minimum recording unit of data, or data of a plurality of sectors may be transmitted at a time. When receiving a predetermined unit of data, the drive returns a command for indicating completion of reception to the host device. In addition, every time recording of a predetermined unit of data received is completed, recording completion and recorded addresses are returned to the host device. At this time, not the recorded addresses but a skip amount for indicating the number of regions where recording has not been performed due to defects and the like may be delivered. For recording of continuous data, the delivery operations of recording data encircled by the dotted line are repeated and the recording data are transmitted to the end.

(C25) When transmission of all recording data is completed, a command for indicating recording completion is transmitted to the device, and the drive returns a confirmation command thereof, so that the recording operation is completed.

By performing such command transmission and reception, the host device can know the address where data have been actually recorded on the disc. Further, the host device can recognize the number of regions where recording has not been performed due to scratches and the like, and the number of recording regions remaining on the disc. Further, by using the information of the number of remaining recording regions, the amount of data to be recorded can be controlled. For example, in the case where data to be recorded are video data, it is possible to control so as to reduce recording data by increasing a compression rate. Furthermore, such commands allow the host device side to control recorded regions of the disc. For example, by recognizing the regions where recording has not been performed, it is possible to produce a list of defect regions on the disc.

FIG. 13 is an example showing a list of defects on the disc according to the skipped addresses. The items include a number for indicating a serial number, a recording specification address from the host device, an address where, when a recording error has occurred at the address and the skip recording has been performed, recording has been actually performed after skipping, a skip length for indicating the length of a skip, and the total of skips for indicating the total of the skip lengths.

For example, No. 1 shows that data to be recorded at an "AAAA" position were transmitted from the host device, a defect was present at the position, and the data were recorded at the next address "AAAA+1". Further, the skip length at this time is "1" because the data could be recorded at the next address. If this error has occurred on the disc for the first time, the total of skips is also "1".

Next, No. 3 shows that in the case where data to be recorded at a "CCCC" position were transmitted from the host device, a defect was present at the position, the next address was skipped due to a defect, and the following address had a defect, the recording data were recorded at the next address "CCCC+3", and the defects were present at three continuous regions. Further, the skip length at this time is "3", and the length of defects which have occurred on the disc is "5" in total. As similar to the above, No. 4 shows that data to be recorded at a "DDDD" position were transmitted from the host device, a defect was present at the position, and n continuous regions were skipped due to defects, the recording data were recorded at an address "DDDD+n", and the defects were present at n continuous regions. Further, the skip length at this time is "n" and the length of defects which have occurred on the disc is "5+n" in total.

As described above, when the list of defects is produced and production of the list for the whole disc is completed, a symbol for indicating the last row is added. For example, by adding a non-existing address (shown as "FFFF . . . FF" in this case), it is possible to identify the last row.

FIG. 14 is another example showing a list of defects on the disc according to the skipped addresses. The items include a number for indicating a serial number, an attribution for indicating the length of a defect region, a skip region address which specifies a skipped address due to occurrence of a recording error at a recording address specified from the host device, a skip length for indicating the length of a skip, and the total of skips for indicating the total of the skip lengths.

For example, No. 1 shows that when data to be recorded at an "AAAA" position were transmitted from the host device and a defect was present at the position, the address "AAAA" is registered as a skipped region. As an attribution of the defect to be registered on the list of defects, a "single" code for indicating one region is recorded. Further, the skipped length at this time is "1" because of a single region. If this error has occurred in the disc for the first time, the total of skips is also "1".

Next, each of Nos. 3 and 4 shows a case of registering on the list of defects in which when skipped regions were a plurality of continuous regions, the top and the last of the regions are shown. As shown in No. 3, in the case where data to be recorded at a "CCCC" position were transmitted from the host device, a defect was present at the position, and a defect was further present at the next address, a symbol for indicating "continuous-start" is recorded as the attribution. When the defects were continuous and the data were finally recorded at "CCCC+3", the defects were present at three continuous regions. At this time, a symbol of "continuous-end" for indicating the last of the skipped regions is recorded as the attribution of No. 4, and the last address "CCCC+2" of the skipped regions due to the defects is recorded. The length of the continuous skipped regions is "3", and the length of defects which have occurred on the disc is "5" in total.

As similar to the above, as shown in Nos. 5 and 6, in the case where data to be recorded at a "DDDD" position were transmitted from the host device, a defect was present at the position, and n continuous regions were skipped due to defects, the first region "DDDD" of the continuous defects and the last region "DDDD+(n−1)" are recorded. Thus, the list shows that the defects were present at n continuous regions. Further, the length of defects which have occurred on the disc is "5+n" in total.

As described above, when the defect list is produced and production of the list for the whole disc is completed, a symbol for indicating the last row is added. For example, by adding a non-existing address ("FFFF" is show in this case), it is possible to identify the last row.

The list of defects on the disc is produced and the list of defects is reproduced when reproducing by such a method. Accordingly, the regions where the skip recording has been performed can be recognized in advance. In addition, by recognizing the total value of the sipped regions, it is possible to recognize a difference between the recording specified address and the actually-recorded address. It should be noted that although the methods shown in FIGS. 13 and 14 are exemplified for production of the list of defects, the items of the list are not limited to those.

According to the embodiment, when a recording error occurs, data are not recorded again into an alternative region which is apart therefrom, but the same data are recorded again into a region subsequently adjacent to that where the recording error has occurred. Accordingly, it is possible to continuously record AV data to be input in real-time while correcting a recording error. Thus, it is possible to avoid a reproducing error and occurrence of a noise in the AV data.

In the embodiment, there is explained a method of alternative recording in which data are recorded again by exemplifying the stream recording. In the case of performing an alternative process in verifying recording, the method can be applied. In this case, the identifiers of the Link region shown in FIG. 6 can be used in such a manner that the identifier of Run-out means a recording failure at the recording region, and the region of Run-in means a region where the skip recording has been performed due to the recording failure at the previous recording region.

The present invention can be applied not only to the BD media described in the embodiment, but also to all types of recordable and rewritable optical media. Further, it is obvious that data to be recorded are not limited to AV data, and the same effect can be obtained as long as data to be recorded are data to be continuously input at a high speed.

BRIEF DESCRIPTION OF THE DRAWINGS

FIG. 13 is a diagram showing an example of a list of defects according to skipped addresses.

FIG. 14 is a diagram showing another example of a list of defects according to skipped addresses.

Figure 1:
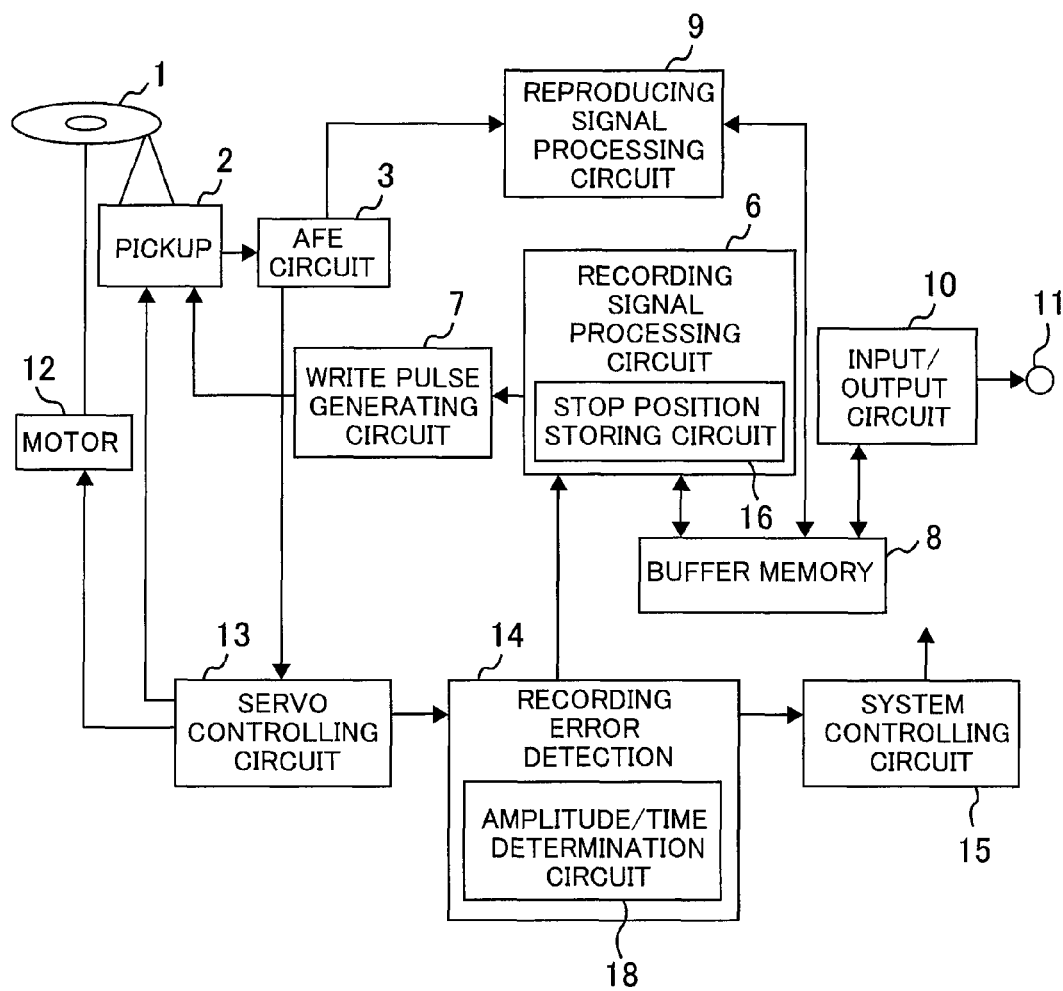
FIG. 1 is a block diagram showing an embodiment of an optical disc device according to the present invention.
Figure 2:
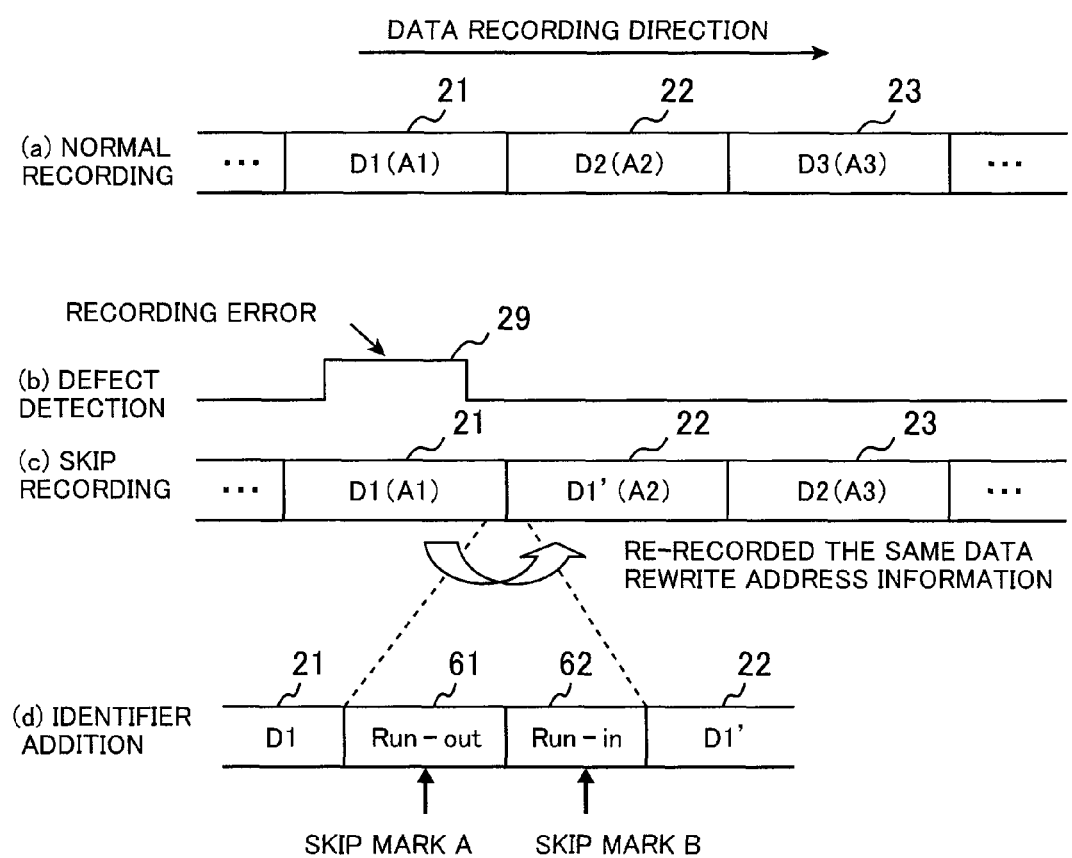
FIG. 2 is a diagram showing an example of a recording pattern on an optical disc by skip recording.
Figure 3:
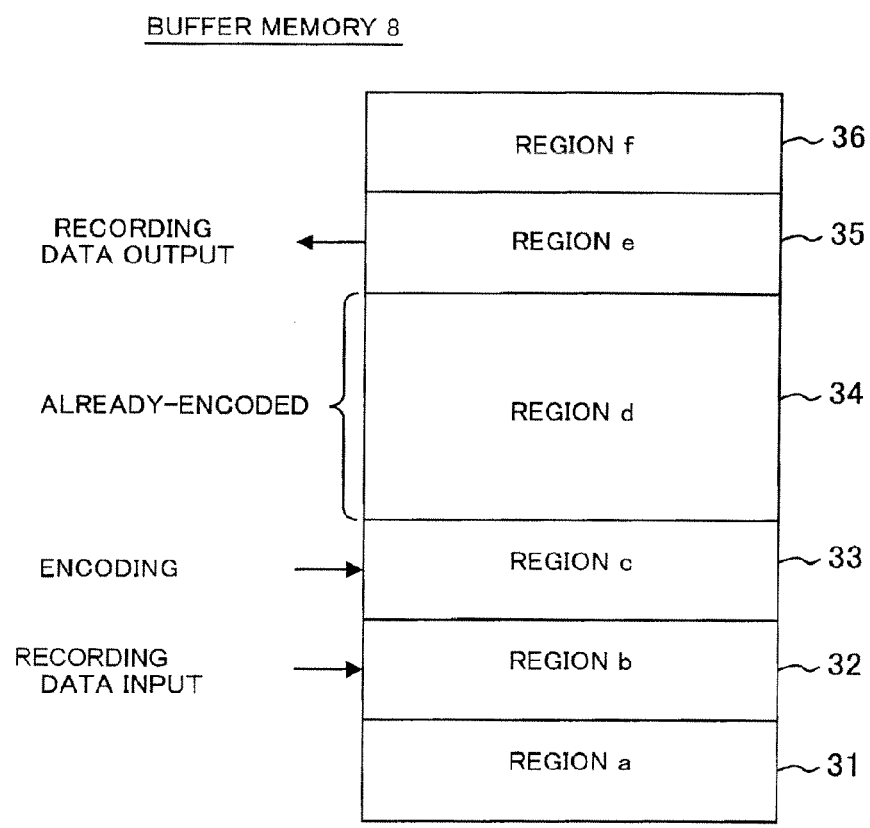
FIG. 3 is a diagram showing a configuration example of a buffer memory 8.
Figure 4:
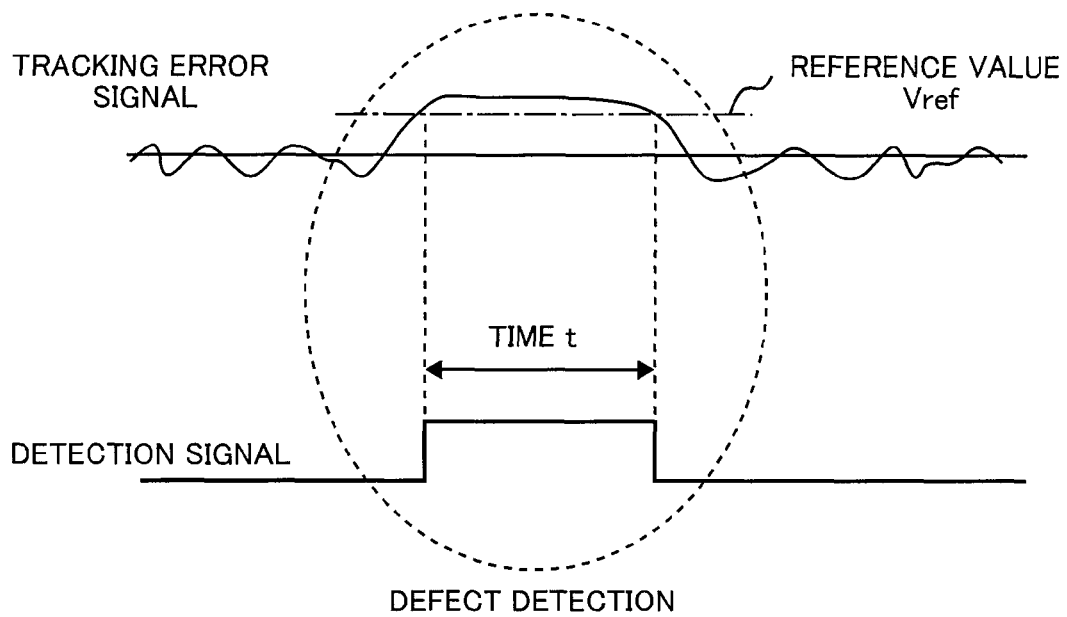
FIG. 4 is a diagram explaining an example of a recording error detection method.
Figure 5:
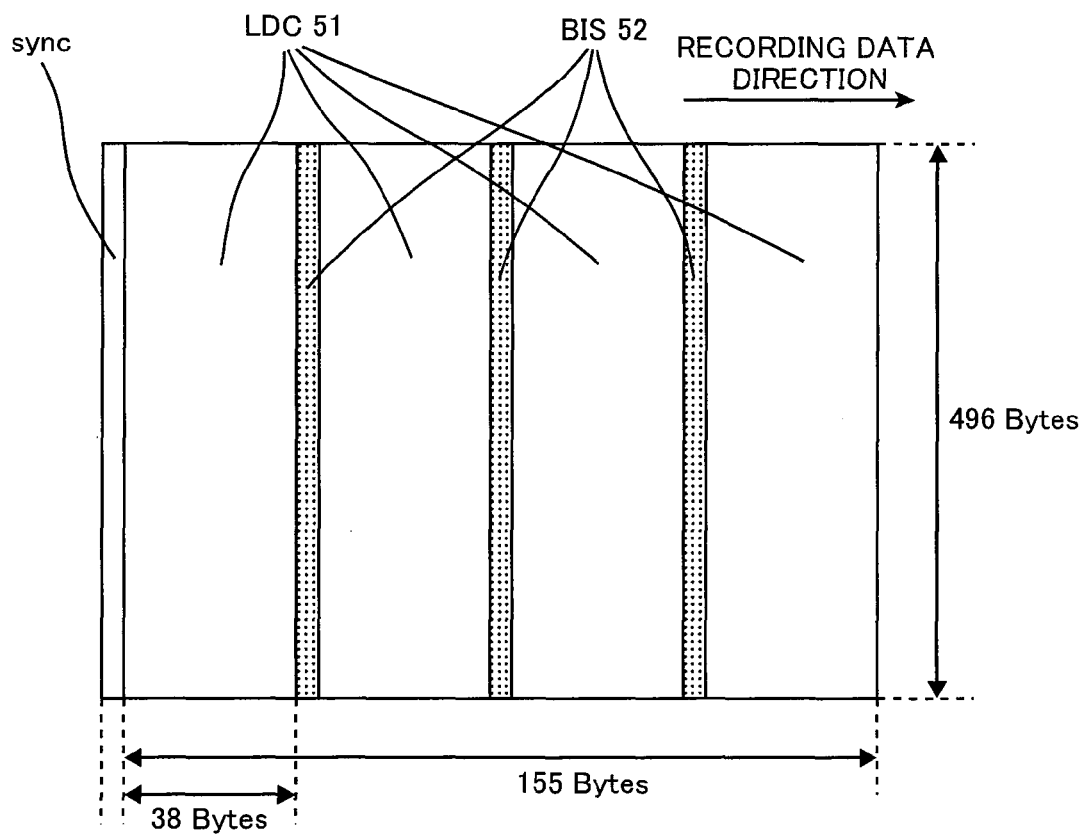
FIG. 5 is a diagram showing a configuration of recording data (Cluster) on a BD.
Figure 6:
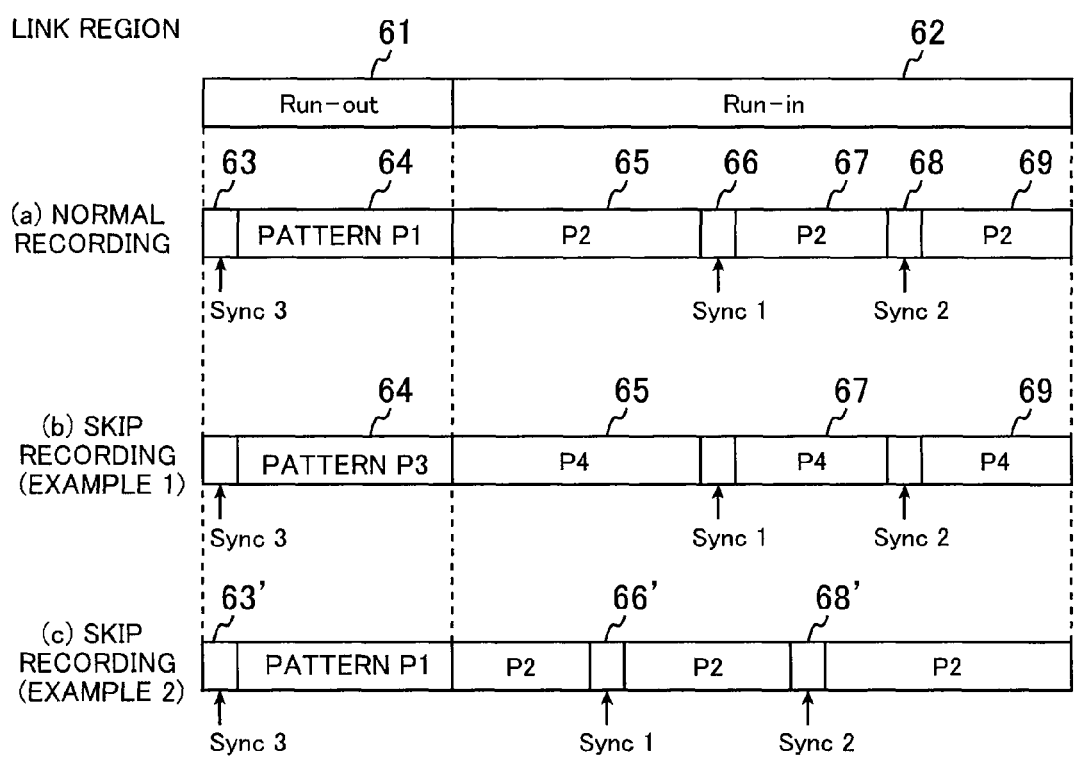
FIG. 6 is a diagram showing an example of identifiers (skip marks) to be added when a recording error occurs.
Figure 7:
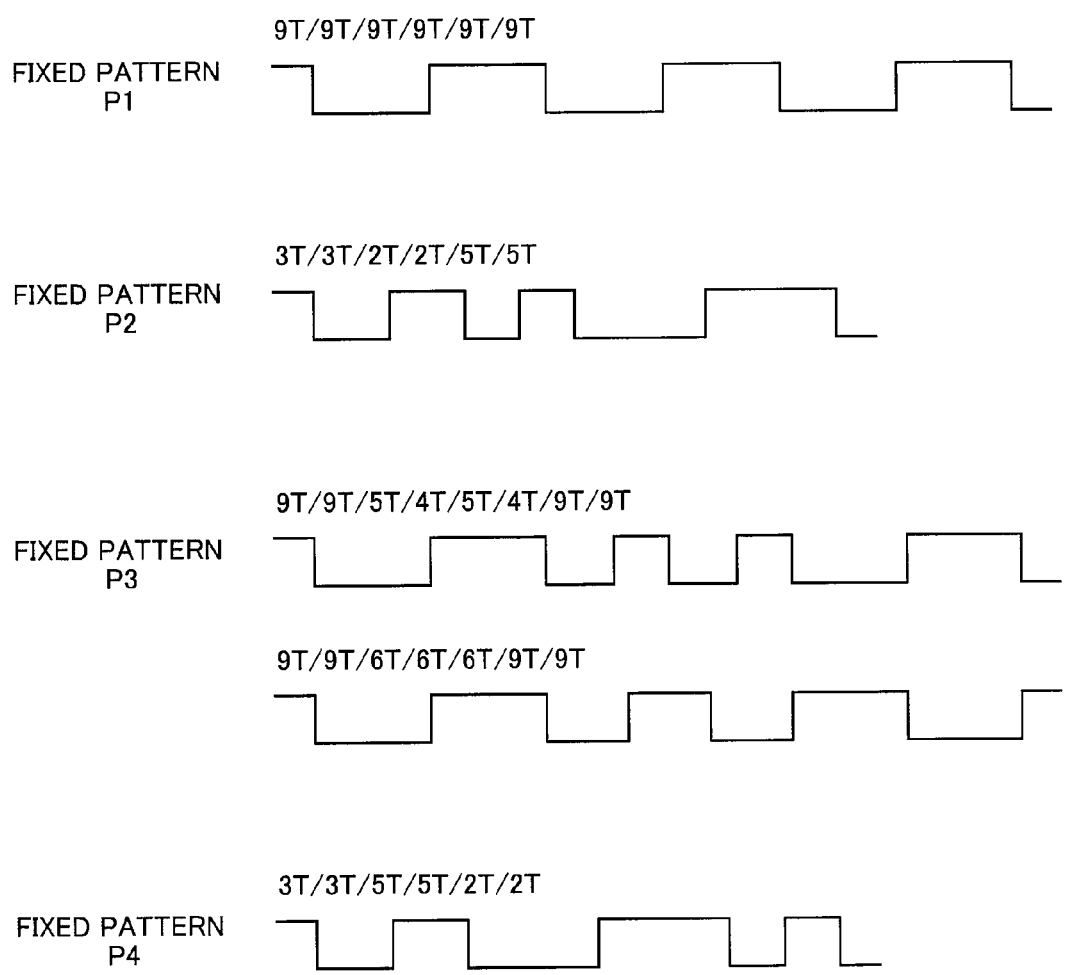
FIG. 7 is a diagram showing an example of a code pattern used for the identifiers.
Figure 8:
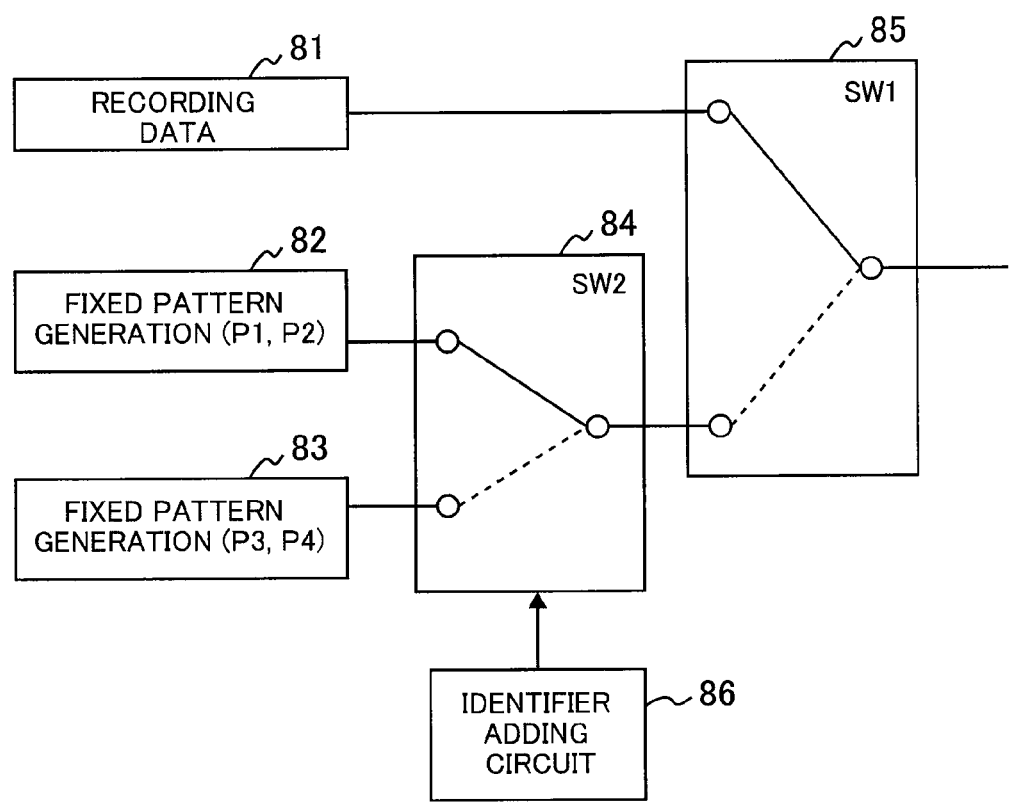
FIG. 8 is a diagram showing an example of a circuit configuration for adding the identifiers.
Figure 9:
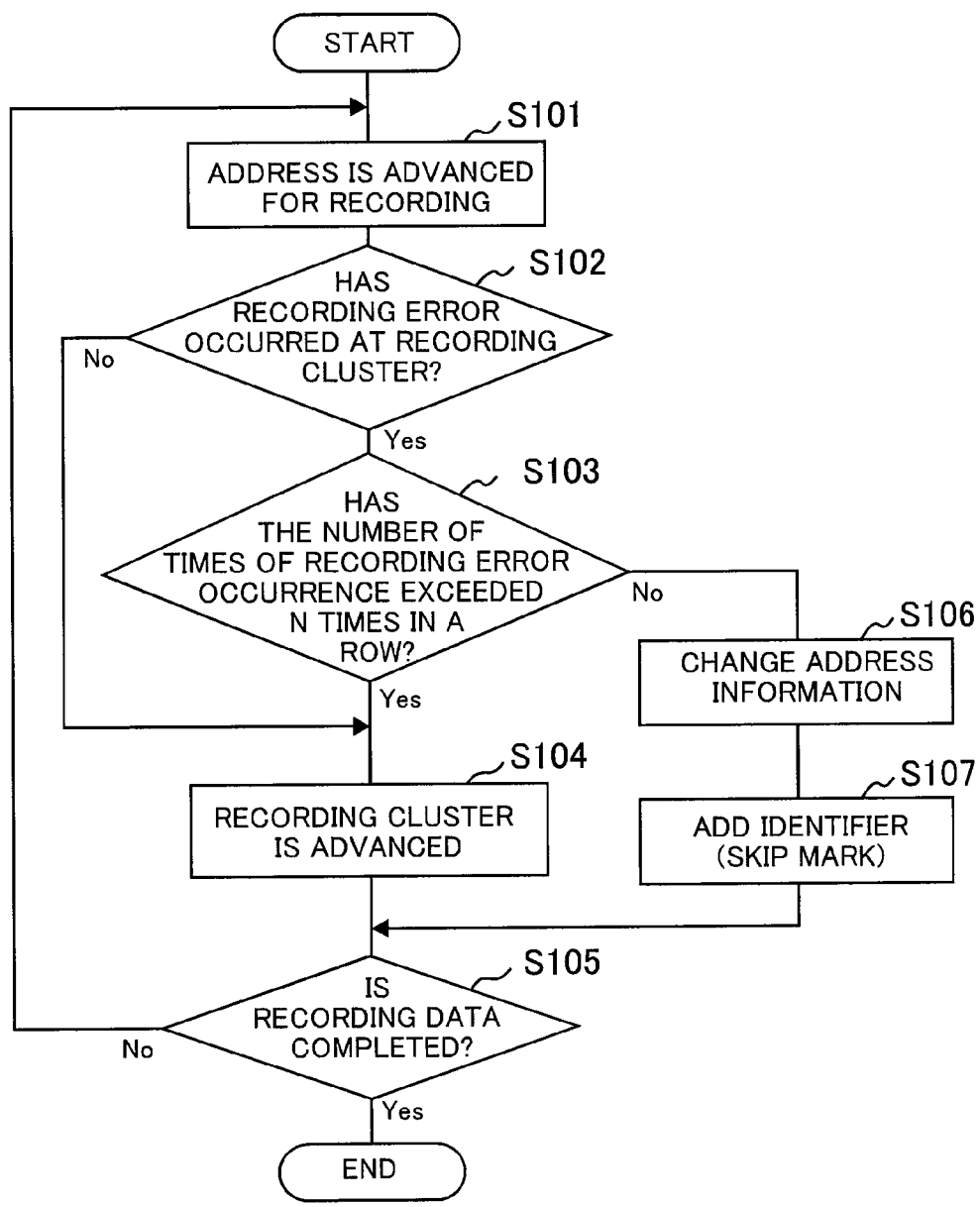
FIG. 9 is a flowchart showing a recording method in the embodiment.
Figure 10:
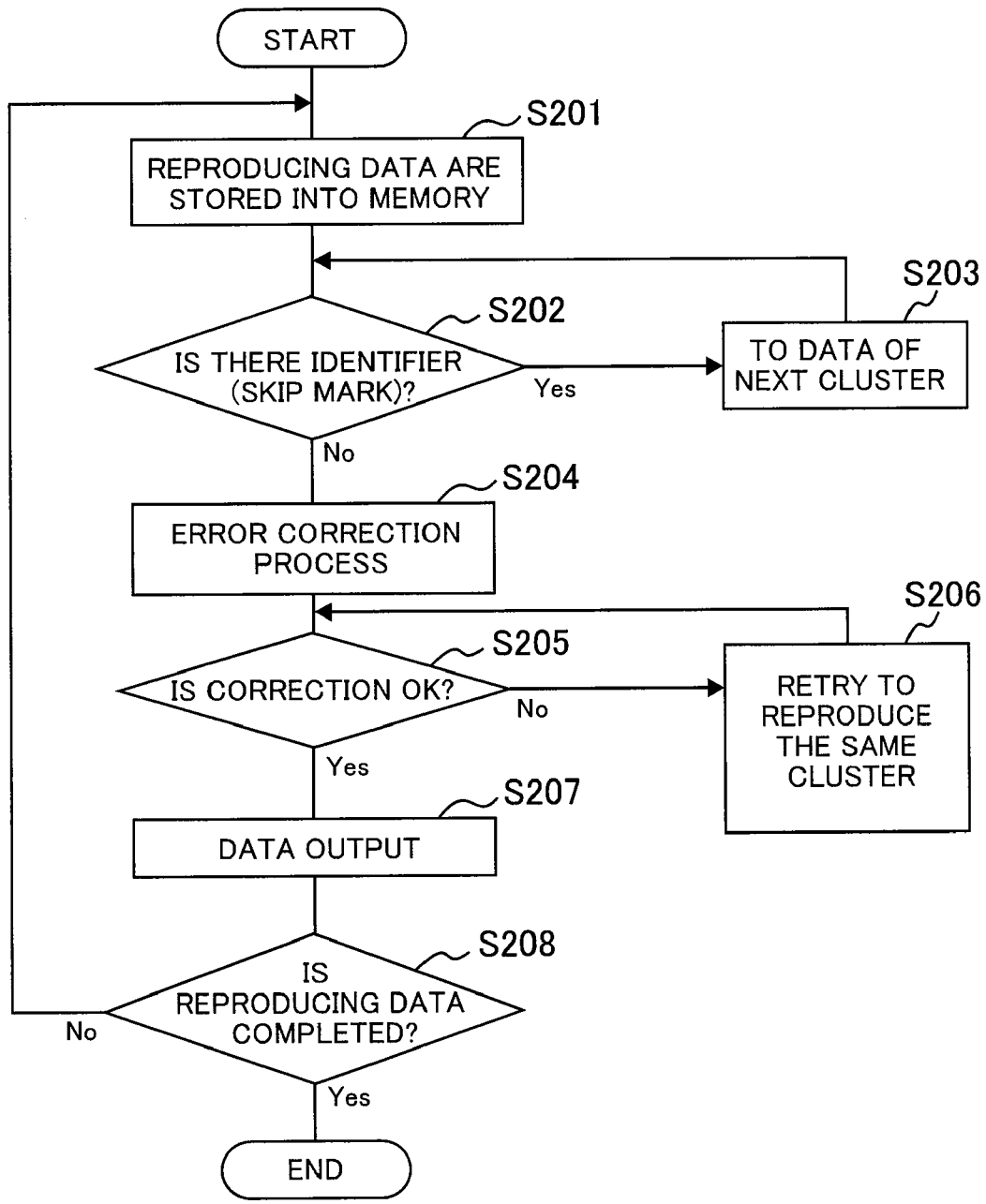
FIG. 10 is a flowchart showing a reproduction method in the embodiment.
Figure 11:
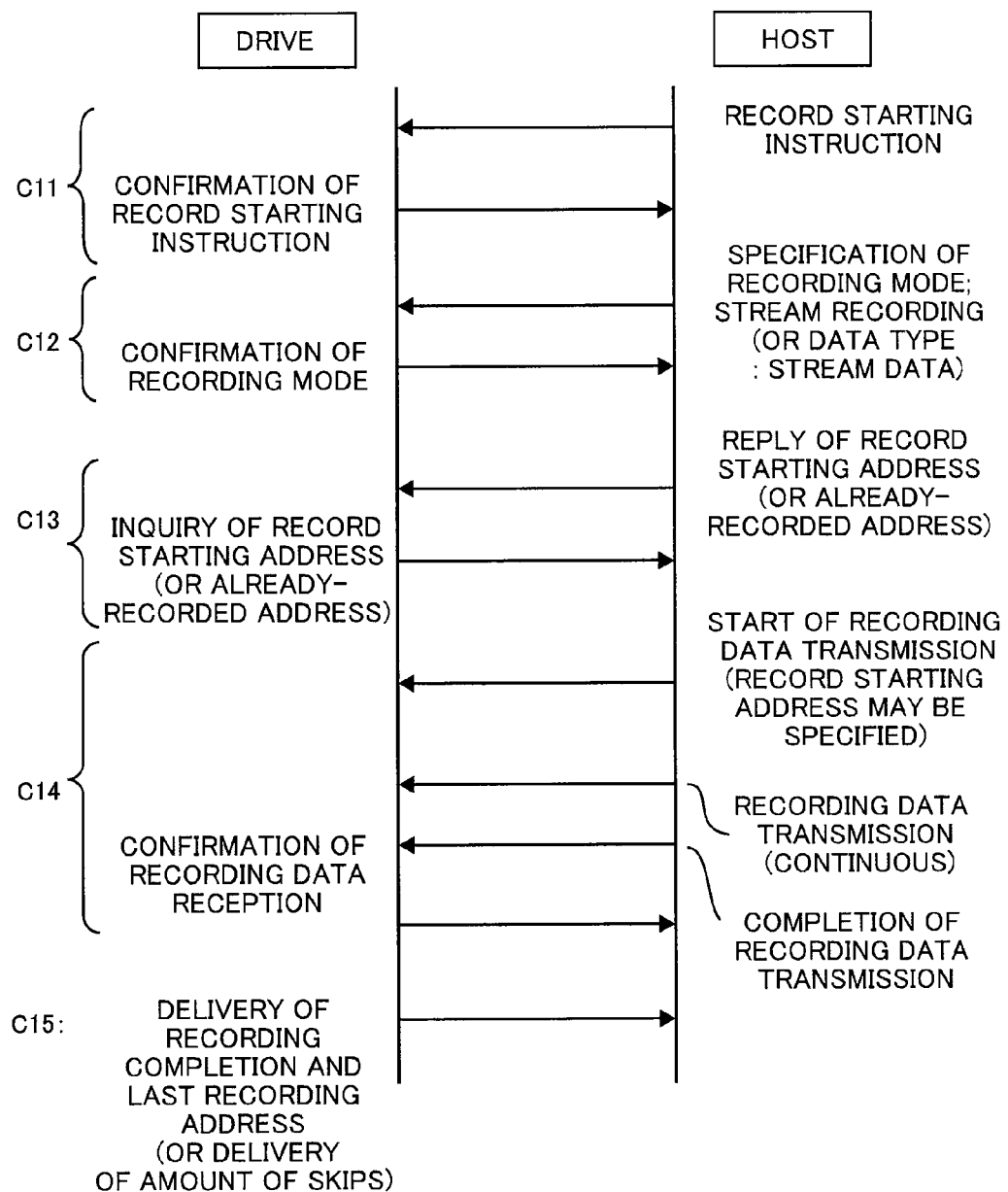
FIG. 11 is a diagram showing an example of transmission and reception of a recording command with a host device.
Figure 12:
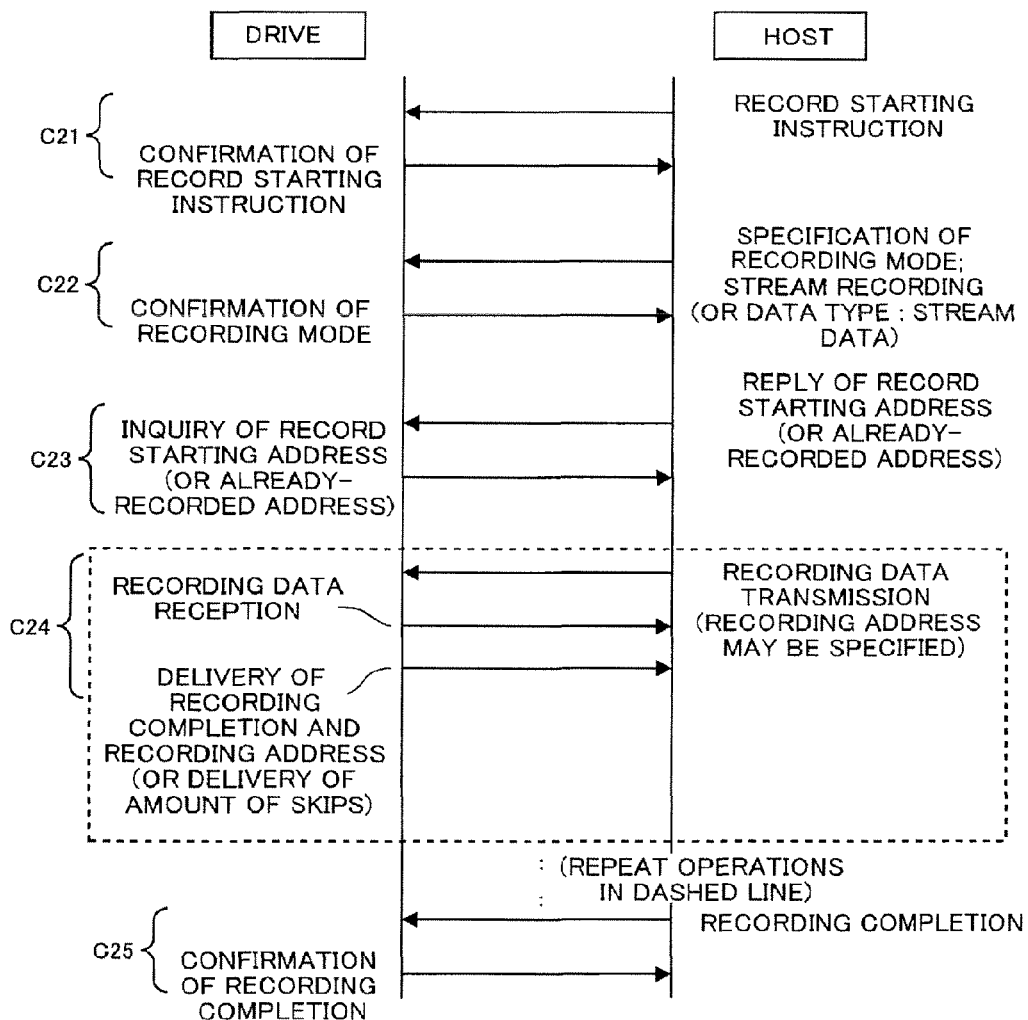
FIG. 12 is a diagram showing another example of transmission and reception of a recording command with the host device.

DESCRIPTION OF REFERENCE NUMERALS 1 optical disc
2 optical pickup
3 analog front-end circuit
6 recording signal processing circuit
7 write pulse generating circuit
8 buffer memory
9 reproducing signal processing circuit
10 input/output circuit
12 spindle motor
13 servo controlling circuit
14 recording error detection circuit
15 system controlling circuit
16 stop position storing circuit
18 amplitude/time determination circuit
52 BIS region
61 Run-out region
62 Run-in region
82, 83 fixed pattern generating circuit
86 identifier adding circuit

The invention claimed is:

1. An optical disc device for recording data into a recordable optical disc, the optical disc device comprising:
a buffer memory configured to temporarily store the data;
a recording signal processing circuit configured to generate a recording signal by: reading the data from the buffer memory, adding error correction codes to the data, encoding and modulating the data to the recording signal; and an optical pickup configured to irradiate laser light onto the recordable optical disc to record the recording signal, wherein:

the recordable optical disc comprises recording regions to record the recording signal and link regions to link a recording region to the next recording region; and either a first specific pattern signal or second specific pattern signal is recorded into a link region of the recordable optical disc, the first specific pattern signal including first synchronizing signals in particular positions of the link region and specific data repeating patterns in other positions of the link region, and the second specific pattern signal including second synchronizing signals in particular positions of the link region and specific data repeating patterns, which are different from the specific data repeating patterns of the first specific pattern signal, in other positions of the link region.

2. The optical disc device according to claim 1, wherein the first synchronizing signals of the first specific pattern signal are similar to the second synchronizing signals of the second specific pattern signal.

3. An optical disc device for reproducing data from an optical disc, the optical disc device comprising:

an optical pickup configured to irradiate laser light onto the optical disc to reproduce a recorded signal;

a reproducing signal processing circuit configured to reproduce data by demodulating, decoding and error-correcting the reproduced recorded signal; and a buffer memory configured to temporarily store the reproduced data, wherein:

the optical disc comprises recording regions having signals recorded therein and link regions to link a recording region to the next recording region; and either a first specific pattern signal or second specific pattern signal is recorded in a link region of the optical disc, the first specific pattern signal including first synchronizing signals in particular positions of the link region and specific data repeating patterns in other positions of the link region, and the second specific pattern signal including second synchronizing signals in particular positions of the link region and specific data repeating patterns, which are different from the specific data repeating patterns of the first specific pattern signal, in other positions of the link region.

4. The optical disc device according to claim 3, wherein the first synchronizing signals of the first specific pattern signal are similar to the second synchronizing signals of the second specific pattern signal.

5. A recording method for recording data into a recordable optical disc, the recordable optical disc comprising recording regions to record recording signals and link regions to link a recording region to the next recording region, the recording method comprising:

temporarily storing the data;

generating a recording signal by reading the data that is temporarily stored, adding error correction codes to the data, encoding and modulating the data to a recording signal; and irradiating laser light onto the recordable optical disc and recording the recording signal onto the recordable optical disc;

wherein, in the step of recording the recording signal onto the recordable optical disc, either a first specific pattern signal or second specific pattern signal is recorded in a link region of the recordable optical disc, the first specific pattern signal includes first synchronizing signals in particular positions of the link region and specific data repeating patterns in other positions of the link region, and the second specific pattern signal includes second synchronizing signals in particular positions of the link region and specific data repeating patterns, which are different from the specific data repeating patterns of the first specific pattern signal, in other positions of the link region.

6. The recording method according to claim 5, wherein the first synchronizing signals of the first specific pattern signal are similar to the second synchronizing signals of the second specific pattern signal.

7. A reproducing method for reproducing data from an optical disc, the optical disc comprising recording regions to record recording signals and link regions to link a recording region to the next recording region, the reproducing method comprising:

irradiating laser light onto the optical disc and reproducing a recorded signal from the optical disc;

generating reproduced data by demodulating, decoding and error-correcting the reproduced recorded signal; and temporarily storing the reproduced data, wherein:

either a first specific pattern signal or a second specific pattern signal is recorded in a link region of the optical disc, the first specific pattern signal includes first synchronizing signals in particular positions of the link region and specific data repeating patterns in other positions of the link region, and the second specific pattern signal includes second synchronizing signals in particular positions of the link region and specific data repeating patterns, which are different from the specific data repeating patterns of the first specific pattern signal, in other positions of the link region.

8. The reproducing method according to claim 7, wherein the first synchronizing signals of in the first specific pattern signal are similar to the second synchronizing signals of the second specific pattern signal.

* * * * *